United States Patent
Rieh et al.

(10) Patent No.: US 10,581,535 B2
(45) Date of Patent: Mar. 3, 2020

(54) METHOD FOR PROVIDING CHIP-TO-CHIP WIRELESS COMMUNICATION AND ELECTRONIC DEVICE THEREOF

(71) Applicants: Samsung Electronics Co., Ltd., Suwon-si, Gyeonggi-do (KR); Korea University Research and Business Foundation, Seoul (KR)

(72) Inventors: Jae-Sung Rieh, Seoul (KR); Daekeun Yoon, Seoul (KR); Jungsoo Kim, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 10 days.

(21) Appl. No.: 15/391,159

(22) Filed: Dec. 27, 2016

(65) Prior Publication Data

US 2017/0201333 A1 Jul. 13, 2017

(30) Foreign Application Priority Data

Jan. 12, 2016 (KR) .................. 10-2016-0003803

(51) Int. Cl.
*H04B 15/02* (2006.01)
*H04B 7/24* (2006.01)

(52) U.S. Cl.
CPC ............. *H04B 15/02* (2013.01); *H04B 7/24* (2013.01)

(58) Field of Classification Search
CPC .................................. H04B 15/02; H04B 7/24
See application file for complete search history.

(56) References Cited

U.S. PATENT DOCUMENTS

| 6,356,173 B1* | 3/2002 | Nagata ............... H01L 23/66 257/664 |
| 6,515,562 B1* | 2/2003 | Takenoshita ......... H01P 5/02 333/248 |

(Continued)

FOREIGN PATENT DOCUMENTS

| KR | 101545094 B1 | 8/2015 | |
| WO | 2014104536 A1 | 7/2014 | |
| WO | WO 2016117834 A1 * | 7/2016 | ............. H01P 5/107 |

OTHER PUBLICATIONS

H. Uchimura, T. Takenoshita and M. Fujii, "Development of the "laminated waveguide"," 1998 IEEE MTT-S International Microwave Symposium Digest (Cat. No. 98CH36192), Baltimore, MD, USA, 1998, pp. 1811-1814 vol. 3.*

(Continued)

*Primary Examiner* — Sam K Ahn
*Assistant Examiner* — Amneet Singh
(74) *Attorney, Agent, or Firm* — Jefferson IP Law, LLP

(57) ABSTRACT

A device and a method for reducing an influence of interference between signals using an aperture array in chip-to-chip wireless communication are provided. The device includes a transmitter including at least one transmission antenna for transmitting a signal, a receiver including at least one reception antenna for receiving the signal, a guide structure including at least one opening for guiding a path of the signal, and the at least one transmission antenna, the at least one reception antenna, and the at least one opening are arranged to correspond to one another.

12 Claims, 13 Drawing Sheets

(56) References Cited

U.S. PATENT DOCUMENTS

| | | | |
|---|---|---|---|
| 7,271,461 B2 | 9/2007 | Dutta | |
| 2005/0046510 A1* | 3/2005 | Kerner | H01P 5/085 333/26 |
| 2008/0238796 A1* | 10/2008 | Rofougaran | H01Q 1/005 343/776 |
| 2009/0315637 A1* | 12/2009 | Rofougaran | H01L 23/66 333/105 |
| 2010/0171675 A1* | 7/2010 | Borja | H01Q 1/38 343/798 |
| 2011/0138619 A1* | 6/2011 | Dayan | H01P 3/121 29/830 |
| 2012/0068890 A1* | 3/2012 | Haroun | H01L 23/66 343/702 |
| 2013/0127070 A1* | 5/2013 | Jung | H01L 23/13 257/777 |
| 2013/0183902 A1* | 7/2013 | McCarthy | H04B 7/24 455/41.2 |
| 2014/0097524 A1* | 4/2014 | Daubenspeck | H01P 3/003 257/664 |
| 2015/0285998 A1* | 10/2015 | Babakhani | G02B 6/13 438/27 |
| 2015/0288410 A1* | 10/2015 | Adiletta | H04B 1/40 455/73 |
| 2016/0043455 A1* | 2/2016 | Seler | H01P 11/002 333/26 |
| 2016/0276727 A1* | 9/2016 | Dang | H01P 5/02 |

OTHER PUBLICATIONS

Qingwu Tang, Bo Chen, Wuqiong Luo and Pu Tang, "Design of a substrate integrated waveguide aperture antenna with Electromagnetic Band Gap structure," 2015 IEEE International Conference on Communication Problem-Solving (ICCP), Guilin, 2015, pp. 353-355.*

S. K. Lim, "Physical design for 3D system on package," in IEEE Design & Test of Computers, vol. 22, No. 6, pp. 532-539, Nov.-Dec. 2005.*

Fourier-transform terahertz near-field imaging of one-dimensional slit arrays-mapping of electric-field-, magnetic-field-, and Poynting vectors; M. A. Seo, A. J. L. Adam, J. H. Kang, J. W. Lee, S. C. Jeoung, Q. H. Park, P. C. M. Planken, and D. S. Kim; Sep. 17, 2007.

A 260 GHz fully integrated CMOS transceiver for wireless chip-to-chip communication; Jung-Dong Park, Shinwon Kang, Siva V Thyagarajan, Elad Alon, and Ali M. Niknejad; Berkeley, CA; 2012.

* cited by examiner

METHOD FOR PROVIDING CHIP-TO-CHIP WIRELESS COMMUNICATION AND ELECTRONIC DEVICE THEREOF

CROSS-REFERENCE TO RELATED APPLICATION(S)

This application claims the benefit under 35 U.S.C. § 119(a) of a Korean patent application filed on Jan. 12, 2016 in the Korean Intellectual Property Office and assigned Serial number 10-2016-0003803, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Korea University Research and Business Foundation.

TECHNICAL FIELD

The present disclosure relates to a method for providing chip-to-chip wireless communication and an electronic device thereof.

BACKGROUND

As a demand for multimedia contents is increasing, electronic devices, such as personal terminals, ultrahigh definition televisions (UHDTVs), or the like, are required to provide a high throughput. To meet the high throughput, researches on chip-to-chip communication showing high efficiency have been conducted. The chip-to-chip communication refers to communication between chips included in the electronic devices. The chip-to-chip communication requires an ultra-wideband frequency in order to obtain high data transfer efficiency. In particular, the demand for the frequency bandwidth of the ultra-wideband may be satisfied by utilizing a terahertz band frequency. The terahertz band has a wavelength less than millimeter and thus has the advantage in implementing a micro system.

However, since the chip-to-chip communication has a very short distance between the chips, signals to be transmitted and received may be transmitted to undesired chips rather than to desired chips according to arrangements between the chips. The phenomenon in which the signals are transmitted to undesired points is referred to as a cross talk. Since the cross talk interferes with transmitting and receiving desired signals, the cross talk may cause distortions in transmitted and received signals during a chip-to-chip wireless communication process and may cause malfunction of a whole system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and a method for wirelessly communicating between neighbor chips.

Another aspect of the present disclosure is to provide a device and a method for wirelessly communicating between near-field chips in multiple channels.

Another aspect of the present disclosure is to provide a device and a method for controlling a data flow based on the number of signals which are transmitted and received between chips.

In accordance with an aspect of the present disclosure, a device for chip-to-chip wireless communication is provided. The device includes a transmitter including at least one transmission antenna for transmitting a signal, a receiver including at least one reception antenna for receiving the signal, and a guide structure including at least one opening for guiding a path of the signal. The at least one transmission antenna, the at least one reception antenna, and the at least one opening are arranged to correspond to one another.

In accordance with another aspect of the present disclosure, an operating method for chip-to-chip wireless communication is provided. The operating method includes transmitting, by a transmitter including at least one transmission antenna, a signal, guiding, by a guide structure including at least one opening, a path of the signal, and receiving, by a receiver including at least one reception antenna, the guided signal. The at least one transmission antenna, the at least one reception antenna, and the at least one opening are arranged to correspond to one another.

Another embodiment of the present disclosure may provide a method and a device for minimizing signal interference by adding an aperture array between chips.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, technology for minimizing signal interference in chip-to-chip wireless communication will be described.

In the following description, the term indicating each entity (for example, a device or an electronic device), the term indicating a signal (for example, data or a message) transmitted/received between entities are merely examples for the convenience of explanation. Therefore, the present disclosure is not limited to the terms described below and other terms having the same technical meaning may be used.

Figure 1:
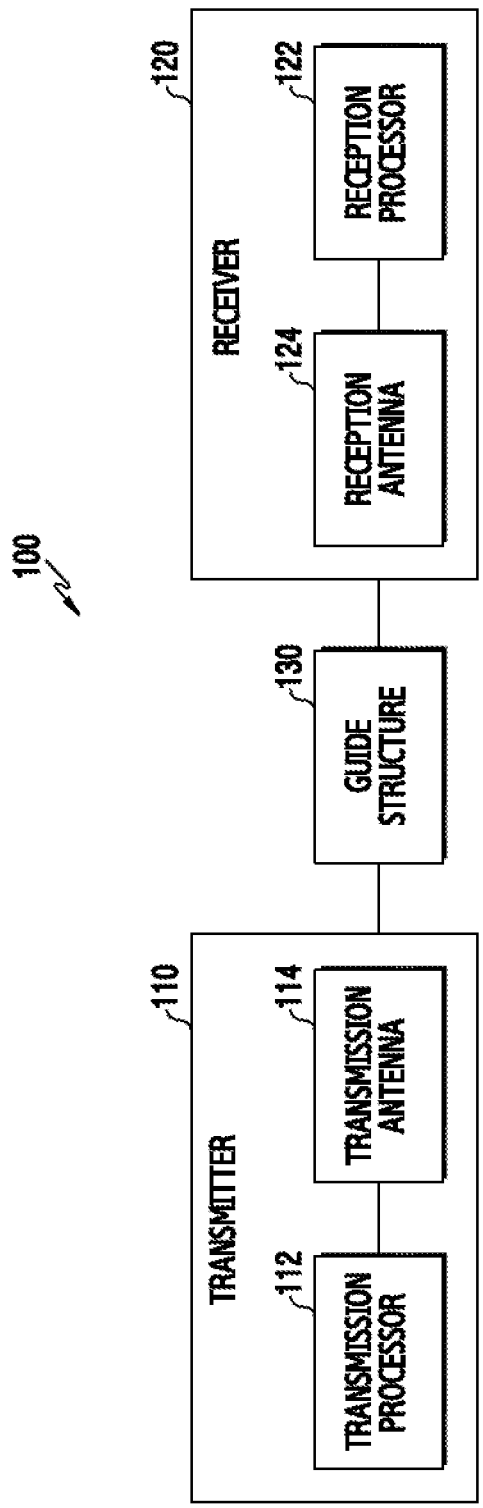
FIG. 1 illustrates a view showing a device for performing chip-to-chip communication according to various embodiments of the present disclosure.

FIG. 1 illustrates a device for performing chip-to-chip communication according to various embodiments of the present disclosure.

Referring to FIG. 1, the device 100 includes a transmitter 110 and a receiver 120. According to an embodiment, each of the transmitter 110 and the receiver 120 may be implemented in various methods.

In some embodiments, the transmitter 110 and the receiver 120 may be components of user equipment for performing various functions. For example, the transmitter 110 and the receiver 120 may be control devices which are included in the user equipment. Each of the control devices may be a single core processor a multi-core processor. In another example, the transmitter 110 and the receiver 120 may be storage devices. Each of the storage devices may be a volatile memory or a nonvolatile memory.

In some embodiments, the transmitter 110 and the receiver 120 may be elements included in the components of the user equipment described above. For example, the transmitter 110 and the receiver 120 may be semiconductor chips included in the volatile or nonvolatile memories.

The transmitter 110 includes a transmission processor 112 and at least one transmission antenna 114. The transmission processor 112 may control the overall operation of the transmitter 110. For example, the transmission processor 112 may generate a signal (or a message) to transmit to the receiver 120. Although only the operation of the transmission processor 112 generating the signal to transmit is illustrated for the convenience of explanation, the transmission processor 112 may perform an operation of processing a received signal as a reception processor 122 shown in FIG. 1. The signal may be at least two signals. In addition, the signal may include a variety of information according to a purpose. For example, the signal may include at least one of a request message, a response message, and a command message. The at least one signal may be generated based on various methods. For example, the transmitter 110 may generate the at least one signal in response to an interpretation method of the receiver 120 which receives the at least one signal.

The transmission processor 112 may be functionally connected with other components. For example, the transmission processor 112 may be connected with the transmission antenna 114. The transmission processor 112 may transmit the signal generated therein to the receiver 120 via the transmission antenna 114 functionally connected therewith.

The transmission antenna 114 may perform an operation of transmitting the signal generated from the transmission processor 112. For example, the transmission antenna1 114 may up-convert the at least one generated signal. Although the transmission antenna 114 is illustrated as performing only the operation of transmitting the signal for the convenience of explanation, the transmission antenna 114 may perform an operation of receiving a signal as a reception antenna 124 shown in FIG. 1 according to an embodiment. In addition, according to various embodiments, the transmission antenna 114 may perform both the operation of transmitting a signal and the operation of receiving a signal. In this case, the transmission antenna 114 may perform the operation of transmitting and the operation of receiving, simultaneously, or may alternate the operation of transmitting and the operation of receiving at a regular interval.

The receiver 120 includes the reception processor 122 and the reception antenna 124. The reception processor 122 may control the overall operation of the receiver 120. For example, the reception processor 122 may process a signal (or a message) received from the transmitter 110. Although only the operation of the reception processor 122 processing the received signal is illustrated for the convenience of explanation, the reception processor 122 may perform an operation of generating a signal to transmit as the transmission processor 112 shown in FIG. 1 according to various embodiments. The signal may be at least two signals. In addition, the signal may include a variety of information according to a purpose. For example, the signal may include at least one of a request message, a response message, and a command message.

The reception processor 122 may be functionally connected with other components. For example, the reception processor 122 may be functionally connected with the reception antenna 124. The reception processor 122 may receive a signal transmitted from the transmitter 110 via the reception antenna 124 functionally connected therewith.

In another example, the reception processor 122 may be functionally connected with a data flow processor, although it is not illustrated in FIG. 1. The data flow processor may control a throughput of data transmitted from the transmitter 110 to the receiver 120. For example, the data flow processor may determine whether the number of at least one signal transmitted from the transmitter 110 exceeds a predetermined threshold value or not. The threshold value may be determined based on state information of the receiver 120 which is received by the data flow processor from the reception processor 122, a data transfer speed, or the like. The state information of the data receiver 120 may include at least one of information on a current amount of jobs of the receiver 120, information on whether there is a load on a job, and information of capability of the receiver 120 to process operations simultaneously.

When the number of the at least one generated signal exceeds the threshold value, the data flow processor may control only signals that do not exceed the threshold value to pass through a guide structure 130. When the number of the at least one generated signal received from the transmitter 110 does not exceed the predetermined threshold value, the data flow processor may control all of the at least one signal to pass through the guide structure 130.

The reception antenna 124 may perform an operation of receiving a signal from the transmitter 110. For example, the reception antenna 124 may down-convert the at least one received signal. Although the reception antenna 124 is illustrated as performing only the operation of receiving the signal for the convenience of explanation, the reception antenna 124 may perform the operation of transmitting a signal as the transmission antenna 114 shown in FIG. 1 according to various embodiments. In addition, according to various embodiments, the reception antenna 124 may perform both the operation of transmitting a signal and the operation of receiving a signal. In this case, the reception antenna 124 may perform the operation of transmitting and the operation of receiving, simultaneously, or may alternate the operation of transmitting and the operation of receiving at a regular interval.

The transmitter 110 and the receiver 120 may transmit and receive signals in various methods. For example, the transmitter 110 and the receiver 120 may transmit and receive signals in a proximity wireless method. According to said method, the transmitter 110 and the receiver 120 may transmit and receive signals through magnetic induction or electrostatic induction. In another example, the transmitter 110 and the receiver 120 may transmit and receive radio signals through a radio frequency (RF). In this case, the transmission antenna 114 and the reception antenna 124 may be designed in consideration of an RF wavelength which is used in transmitting and receiving signals. In another example, the transmitter 110 and the receiver 120 may transmit and receive signals using coils. In this case, the coils of the transmitter 110 and the receiver 120 may perform the functions of the transmission antenna 114 and the reception antenna 124, respectively. The transmitter 110 and the receiver 120 should include the coils in the same locations to transmit and receive signals to and from each other. For example, when the coil for the transmitter 110 to transmit a signal is included in the center of the transmitter 110, the receiver 120 may include the coil in the center thereof to receive the maximum number of transmitted signals.

A signal generated from the transmission antenna 114 may not be transmitted to a desired location of the reception antenna 124 due to various phenomena. The various phenomena refer to refraction, diffraction, and scattering of a signal. In particular, in the case of chip-to-chip communication using a high frequency of a terahertz band, since the transmitter 110 or the receiver 120 transmits and receives at least one signal via multiple channels in order to meet the demand for high speed communication, there is a need to solve the above-mentioned problem.

The device 100 may also include the guide structure 130. The guide structure 130 may guide a path of a signal generated from the at least one transmission antenna 114 of the transmitter 110. The guided signal may arrive at the at least one reception antenna 124 of the receiver 120.

According to a technology implementation method, the guide structure 130 may have various shapes. For example, the guide structure 130 may be an aperture array. In addition, according to a technology implementation method, the guide structure 130 may be disposed on various locations. For example, the guide structure 130 may be disposed between the transmitter 110 and the receiver 120, or the transmitter 110, the receiver 120, and the guide structure 130 may be stacked one on another in sequence.

Figure 2:
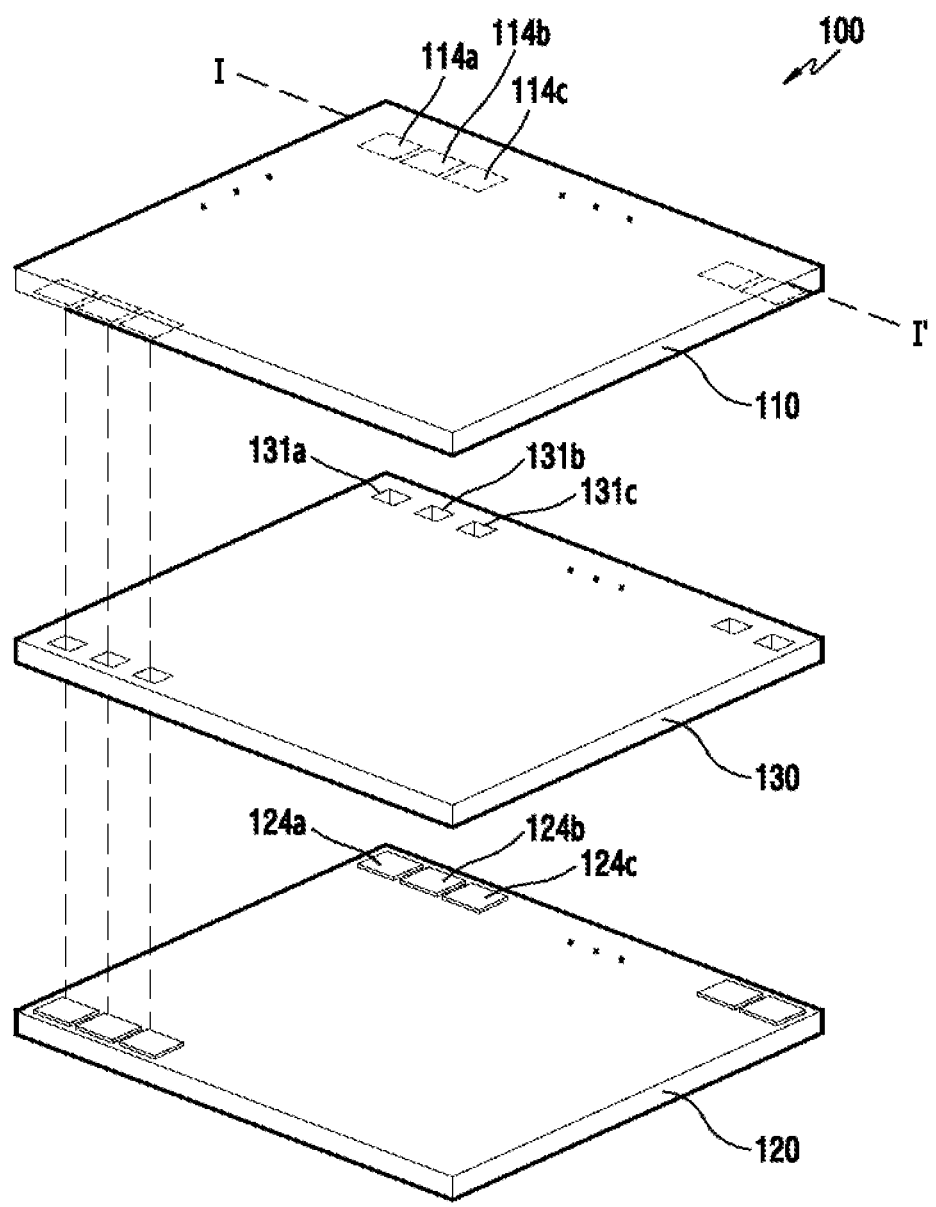
FIG. 2 illustrates a view showing an example of a device in which an aperture array is disposed in chip-to-chip communication according to various embodiments of the present disclosure.

FIG. 2 illustrates a view showing an example of a device in which an aperture array is disposed in chip-to-chip wireless communication according to various embodiments of the present disclosure.

Referring to FIG. 2, the transmitter 110 includes a plurality of transmission antennas. The plurality of transmission antennas may be disposed on various side surfaces of the transmitter 110 according to an implementation method. For example, as shown in FIG. 2, the plurality of transmission antennas may be disposed on the lower side surface of the transmitter 110. In another example, the plurality of transmission antennas may be disposed on the upper side surface of the transmitter 110.

The number of the plurality of transmission antennas may vary according to an implementation method. For example, the number of the plurality of transmission antennas may be 10 by 10 transmission antennas, although they are not illustrated in FIG. 2. Each of the plurality of transmission antennas may transmit a signal generated in the transmission processor 112. For the convenience of explanation, transmission antennas 114a, 114b, and 114c are illustrated as such plurality of transmission antennas for transmitting signals.

The plurality of transmission antennas may be implemented in various shapes according to a technology implementation method. For example, each of the plurality of transmission antennas may be rectangular as shown in FIG. 2. Each of the plurality of transmission antennas may have a circular, spiral, or zigzag shape although they are not shown. The zigzag shape refers to a shape having two or more antenna coils arranged alternately.

The receiver 120 includes a plurality of reception antennas. The locations, number, and shapes of the plurality of reception antennas may vary according to an implementation method. In addition, the locations, number, and shapes of the plurality of reception antennas may be the same as the locations, number, and shapes of the plurality of transmission antennas. Each of the plurality of reception antennas may receive a signal transmitted from each of the plurality of transmission antennas. For the convenience of explanation, reception antennas 124*a*, 124*b*, and 124*c* are illustrated as such plurality of reception antennas for receiving signals.

The guide structure 130 may be disposed between the transmitter 110 and the receiver 120. The location of the guide structure 130 may vary according to a technology implementation method. The guide structure 130 may include a plurality of openings. A plurality of signals transmitted from the plurality of antennas of the transmitter 110 may pass through the plurality of corresponding openings. The number of the openings may vary according to an implementation method. For example, the number of the openings may be the same as the number of the transmission antennas included in the transmitter 110 or the number of the reception antennas included in the receiver 120. For the convenience of explanation, the guide structure 130 is illustrated as including only openings 131*a*, 131*b*, and 131*c*.

The area of the guide structure 130 may vary according to an implementation method. For example, the area of the guide structure 130 may be the same as or similar to the area of the transmitter 110 and the receiver 120. In addition, the thickness of the guide structure 130 may vary according to an implementation method. For example, the thickness of the guide structure 130 may be the same as or similar to the thickness of the transmitter 110 and the receiver 120.

The guide structure 130 may include various materials according to an implementation method. For example, the guide structure 130 may include the same materials as those of the components included in the transmitter 110 and the receiver 120. More specifically, the guide structure 130 may include an epoxy resin, a polyimide resin, a bismaleimide-triazine (BT) resin, flame retardant (FR)-4, FR-5, ceramic, silicon, metal, or glass. However, the above-mentioned examples are merely examples and do not limit the present disclosure set forth in the claims.

A cross section of each of the openings may vary according to an implementation method. For example, each of the openings may have the same shape as that of the transmission antennas or the reception antennas. In this case, the shape of the cross section of the openings may be at least one of a rectangular shape, a spherical shape, a polygonal shape, and a spiral shape.

The locations of the openings in the guide structure 130 may vary according to an implementation method. For example, as shown in FIG. 2, the openings may be arranged in the guide structure 130 at a predetermined distance from one another. The predetermined distance may be determined according to an arrangement distance between the plurality of antennas included in the transmitter 110 and the receiver 120.

The plurality of signals passing through the openings may be transmitted to the plurality of corresponding reception antennas of the receiver 120. For example, when the guide structure 130 is not disposed, the signal generated from the transmission antenna 114*a* may not be transmitted to the reception antenna 124*a* due to the above-described various phenomena. In this case, the signal generated from the transmission antenna 114*a* may transmitted to the reception antenna 124*b*, the reception antenna 124*c*, or other reception antennas which are not illustrated. When the guide structure 130 is disposed between the transmitter 110 and the receiver 120, the guide structure 130 may guide the plurality of signals generated from the plurality of antennas to desired reception antennas. For example, the signal generated from the transmission antenna 114*a* may be transmitted to the reception antenna 124*a* via the corresponding opening 131*a*. In another example, the signal generated from the transmission antenna 114*b* may be transmitted to the reception antenna 124*b* via the corresponding opening 131*b*.

Figure 3:
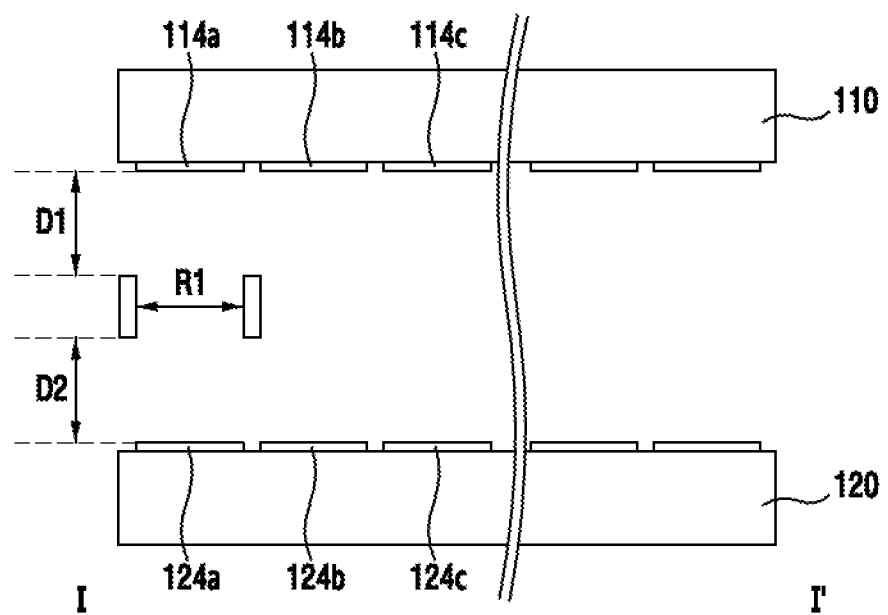
FIG. 3 illustrates a cross section view to explain chip-to-chip wireless communication according to various embodiments of the present disclosure.

To illustrate the operation of the signal transmitted from the plurality of transmission antennas 114*a*, 114*b*, and 114*c* being received by the plurality of reception antennas 124*a*, 124*b*, and 124*c* via the guide structure 130 from another side, FIG. 3 illustrates a cross section view taken along line I-I' of FIG. 2.

FIG. 3 illustrates a cross section view to explain chip-to-chip wireless communication according to various embodiments of the present disclosure.

Referring to FIG. 3, a cross section view taken along line I-I' of FIG. 2. For the convenience of explanation, some of the plurality of transmission antennas included in the transmitter 110 and some of the plurality of reception antennas included in the receiver 120 are omitted in FIG. 3. In addition, for the convenience of explanation, all of the plurality of openings included in the guide structure 130 except one are omitted. However, the number of the transmission antennas, the number of the reception antennas, and the number of the openings may vary and do not limit the scope of the present disclosure.

Referring to FIG. 3, the guide structure 130 is disposed between the transmitter 110 and the receiver 120. In other words, the plurality of transmission antennas included in the transmitter 110, the plurality of openings included in the guide structure 130, and the plurality of reception antennas included in the receiver 120 are stacked one on another in sequence. However, said arrangements are merely an example and the locations of the transmitter 110, the receiver 120, and the guide structure 130 may vary according to an implementation method.

A distance D1 between the transmitter 110 and the guide structure 130, a distance D2 between the receiver 120 and the guide structure 130, and an inner diameter R1 of the opening included in the guide structure 130 may vary according to their respective implementation methods. For example, the inner diameter R1 of the opening may be smaller than a width of at least one of the transmission antenna 114*a* or the reception antenna 124*a*. In another example, the distance D1 between the transmitter 110 and the guide structure 130 or the distance D2 between the receiver 120 and the guide structure 130 may be smaller than the inner diameter R1 of the opening. In addition, D1 and D2 may be 0 according to an implementation method. In other words, the distance between the transmitter 110 and the guide structure 130 and the distance between the receiver 120 and the guide structure 130 may be 0. However, the values of D1 and D2 are merely examples and the function of the guide structure 130 may be similarly performed unless the values of D1 and D2 are excessively larger than the inner diameter R1 of the opening.

Figure 4:
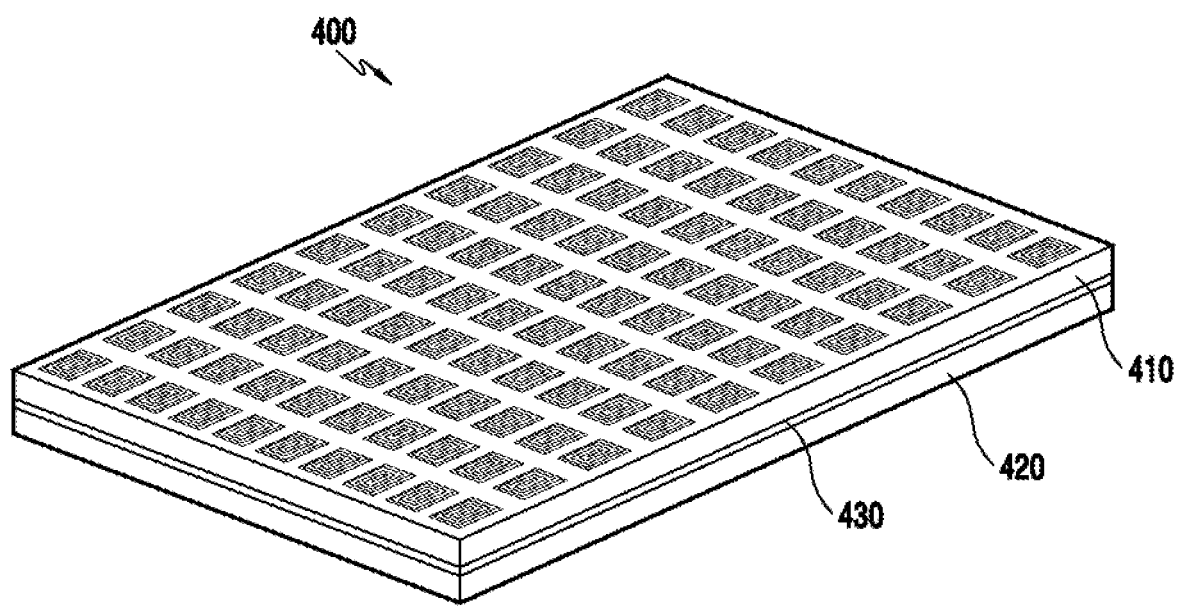
FIG. 4 illustrates a view showing an example of a device in which an aperture array is disposed in chip-to-chip wireless communication according to an embodiment of the present disclosure.

FIG. 4 illustrates a view showing an example of a device in which an aperture array is disposed in chip-to-chip wireless communication according to an embodiment of the present disclosure.

Referring to FIG. 4, the device 400 includes a transmitter 410, a receiver 420, and a guide structure 430. FIG. 4 illustrates a case in which distances between the transmitter 410, the receiver 420, and the guide structure 430 are 0 as described with reference to FIG. 3. The distances between the transmitter 410, the receiver 420, and the guide structure 430 may be determined by the influence of interference on a signal generated from the transmitter 410.

A plurality of transmission antennas included in the transmitter 410 may be disposed on the upper side surface of the transmitter 410. In addition, a cross section of each of the plurality of transmission antennas included in the transmitter 410 may have a spiral shape.

Figure 5:
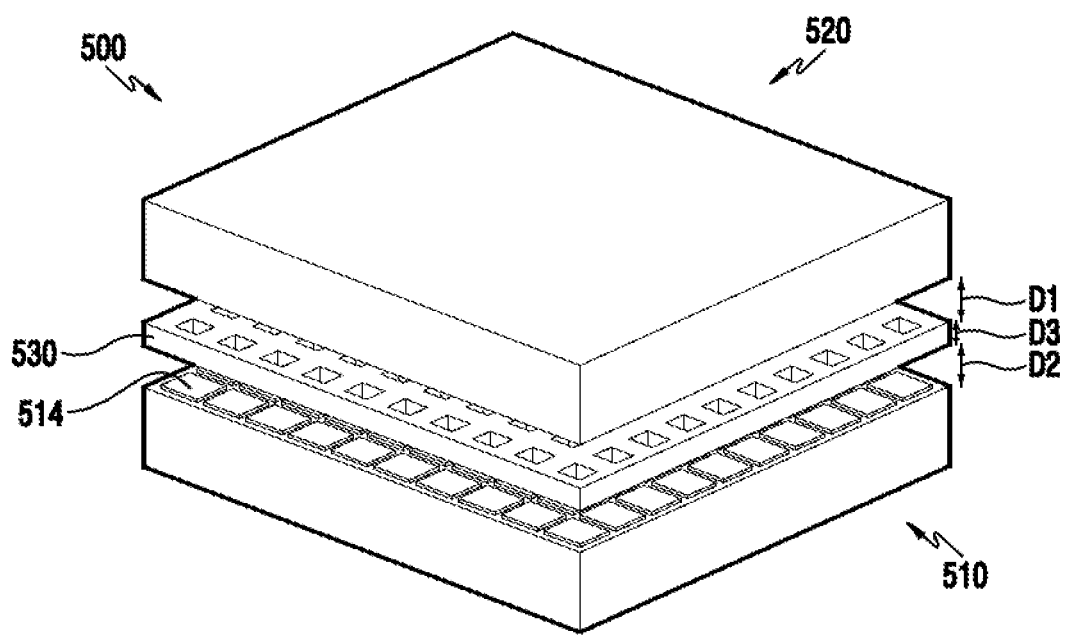
FIG. 5 illustrates a view showing an example of a device in which an aperture array is disposed in chip-to-chip wireless communication according to an embodiment of the present disclosure.

FIG. 5 illustrates a view showing an example of a device in which an aperture array is disposed in chip-to-chip wireless communication according to an embodiment of the present disclosure.

Referring to FIG. 5, an embodiment in which a signal generated in a transmitter disposed on a lower side is transmitted to a receiver disposed on an upper side.

Referring to FIG. 5, the device 500 includes a transmitter 510, a receiver 520, and a guide structure 530. FIG. 5 illustrates a case in which distances between the transmitter 510, the receiver 520, and the guide structure 530 are not 0 as described above with reference to FIG. 3. In this case, the distance D2 between the transmitter 510 and the guide structure 530, the distance D1 between the receiver 520 and the guide structure 530, and the thickness D3 of the guide structure 530 may be determined by the influence of interference from the other signals while a plurality of signals generated from a plurality of transmission antennas 514 included in the transmitter 510 are transmitted to a plurality of reception antennas (not shown) included in the receiver 520.

Figure 6:
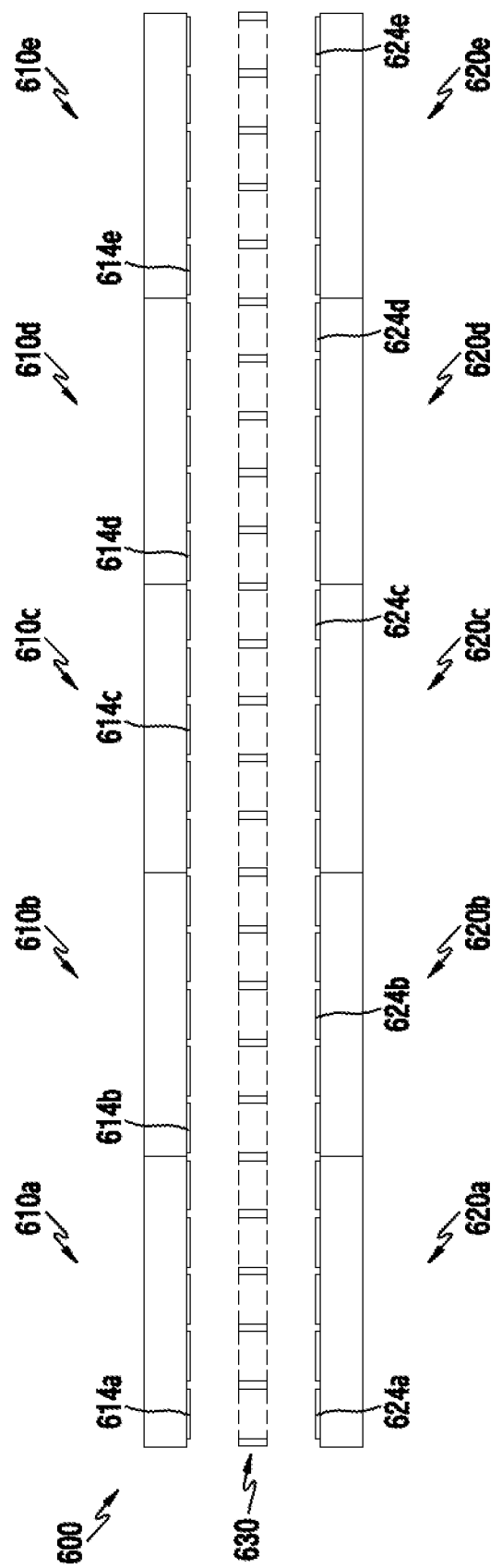
FIG. 6 illustrates a cross section view to explain chip-to-chip wireless communication in multiple channels according to an embodiment of the present disclosure.

FIG. 6 illustrates a cross section view to explain chip-to-chip wireless communication in multiple channels according to an embodiment of the present disclosure.

Referring to FIG. 6, a device 600 includes one guide structure 630, a plurality of transmitters, and a plurality of receivers. When the guide structure 630 is not disposed between the plurality of transmitters and the plurality of receivers, at least one signal generated from the plurality of transmitters may influence its neighbor signals. For example, a signal generated from a transmission antenna 614a may influence a signal generated from a transmission antenna 614b. In this case, the signal generated from the transmission antenna 614b may not maintain directivity due to interference. Accordingly, the signal generated from the transmission antenna 614b may not arrive at a reception antenna 624b.

To solve the above-mentioned problem, the plurality of transmitters should be arranged at a predetermined distance from one another. However, said method requires many spaces and eventually may cause an oversized product.

When the guide structure 630 is disposed between the plurality of transmitters and the plurality of receivers, the above-mentioned problem may be solved. The guide structure 630 may be disposed at predetermined distances from the plurality of transmitters and the plurality of receivers as shown in FIG. 5, or may be disposed without a distance therebetween as shown in FIG. 4. Due to the presence of the guide structure 630, a signal generated from each of the plurality of transmission antennas may not interfere with signals generated from neighbor transmission antennas. Accordingly, the signal may arrive at a desired reception antenna. According to the above-described method, each of the plurality of transmitters and the plurality of receivers may be arranged without a distance from a neighbor transmission device and a neighbor reception device.

Figure 7:
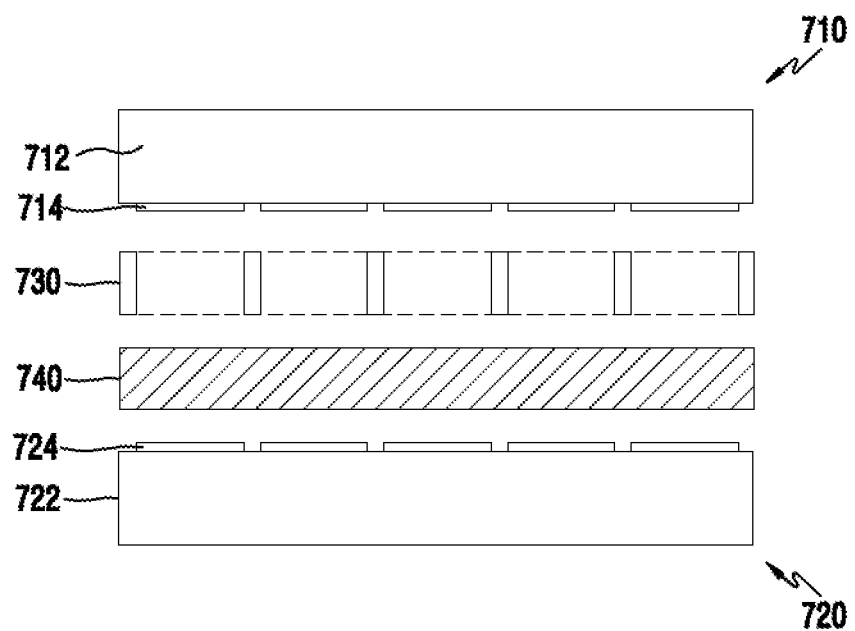
FIG. 7 illustrates a plane view showing a device for controlling a chip-to-chip communication operation according to an embodiment of the present disclosure.

FIG. 7 illustrates a plane view of a device for controlling a chip-to-chip wireless communication operation according to an embodiment of the present disclosure.

Referring to FIG. 7, a transmitter 710 includes a transmission processor 712 and a transmission antenna 714. A receiver 720 includes a reception processor 722 and a reception antenna 724. For the convenience of explanation, the transmitter 710 is a device for transmitting a signal, and the receiver 720 is a device for receiving a signal. However, at least one signal may be transmitted from the receiver 720 to the transmitter 710 according to other embodiments. In addition, the transmitter 710 and the receiver 720 may exchange a signal with each other according to other embodiments.

A guide structure 730 is disposed between the transmitter 710 and the receiver 720. In addition, a data flow processor 740 is disposed between the transmitter 710 and the receiver 720. The data flow processor 740 may adjust the number of signals transmitted from the transmitter 710 to the receiver 720 via the guide structure 730. The locations of the guide structure 730 and the data flow processor 740 relative to each other may vary according to an implementation method. For example, the data flow processor 740 may be disposed on the lower end of the guide structure 730 as shown in FIG. 7 or may be disposed on the upper end of the guide structure 730.

The data flow processor 740 may control the number of signals transmitted from the transmission device. For example, the data flow processor 740 may determine whether the number of signals transmitted from the transmitter 110 exceeds a predetermined threshold value or not. The threshold value may be determined based on state information of the receiver 720 which is received by the data flow processor from the reception processor 722 included in the receiver 720, a data transfer speed, or the like. The state information of the receiver 720 may include at least one of information of a current amount of jobs of the receiver 720, information on whether there is a load on a job, and information of capability of the receiver 720 to process operations simultaneously.

When the data flow processor 740 determines that the number of signals transmitted from the transmitter 710 is greater than or equal to the threshold value, the data flow processor 740 may restrict the number of signals passing through the guide structure 730. The number of the restricted signals may vary according to an implementation method. When the data flow processor 740 determines that the number of signals transmitted from the transmitter 710 is less than the threshold value, the data flow processor 740 may control all of the signals transmitted from the transmitter 710 to pass through the guide structure 730. It is noted that although the transmission processor 712, the reception processor 722, and the data flow processor 740 are illustrated as single devices for simplicity, the present disclosure is not so limited, and the corresponding functions therein may be performed by a plurality of processors without departing from the teachings of the disclosure.

Figure 8:
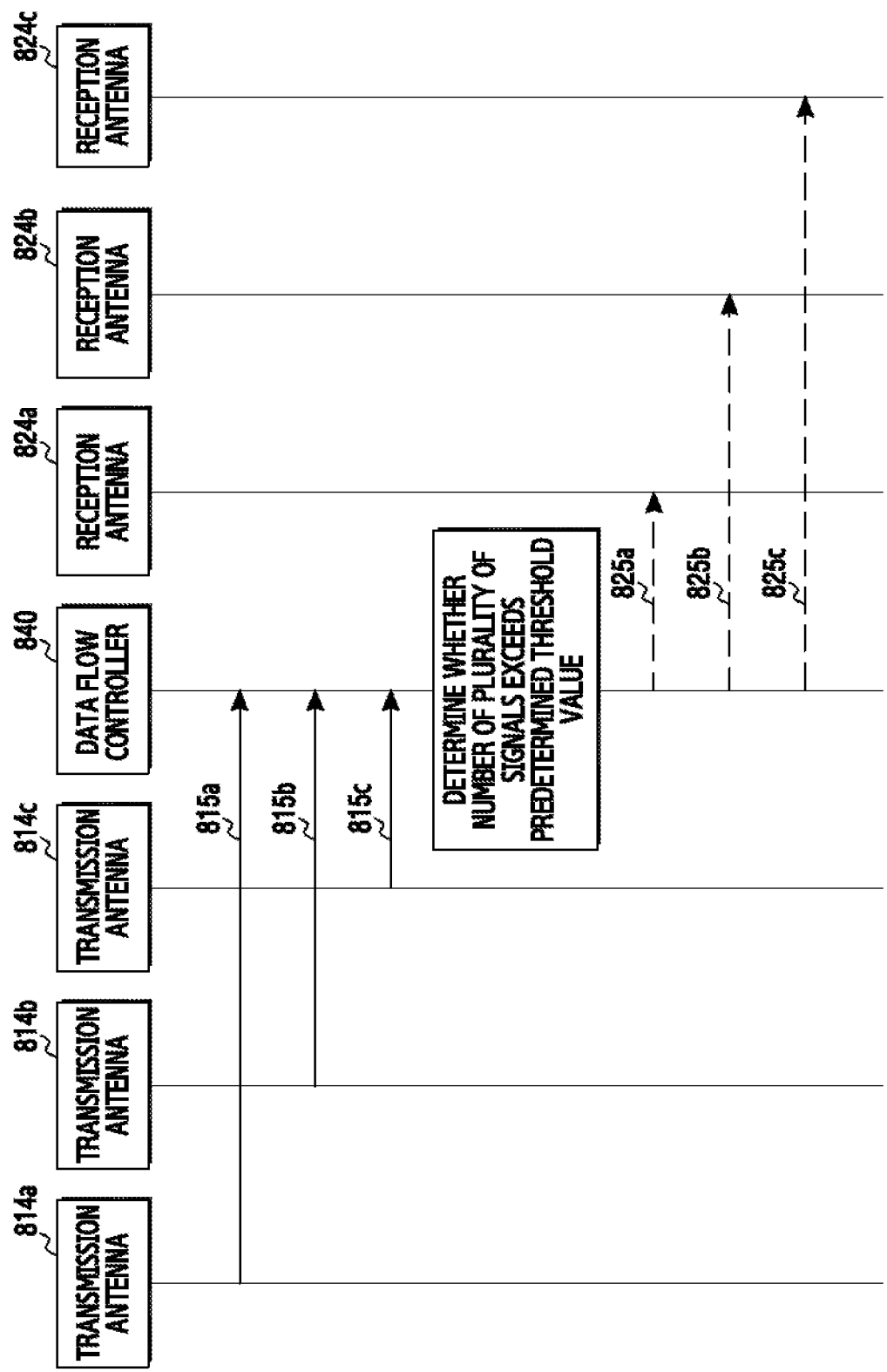
FIG. 8 illustrates a flowchart of a signal of a device for controlling chip-to-chip wireless communication according to an embodiment of the present disclosure.

FIG. 8 illustrates a signal flow of a device for controlling chip-to-chip wireless communication according to an embodiment of the present disclosure.

Referring to FIG. 8, the plurality of transmission antennas and the plurality of reception antennas may correspond to transmission antennas and reception antennas included in the transmitter 110 and the receiver 120 illustrated in FIG. 1, respectively. The number of the transmission antennas and the number of the reception antennas may vary according to an implementation method. For example, as shown in FIG. 8, the number of the plurality of transmission antennas and the number of the plurality of reception antennas may be 3. In addition, the number of the plurality of transmission antennas and the number of the plurality of reception antennas may be less than 3 or greater than 3 according to an implementation method. For the convenience of explanation, FIG. 8 illustrates only a process in which signals 815a, 815b, and 815c generated from transmission antennas

814*a*, 814*b*, and 814*c* are transmitted to reception antennas 824*a*, 824*b*, and 824*c*, respectively, as signals 825*a*, 825*b*, and 825*c*, respectively.

Although not shown in FIG. 8, signals generated from the transmission antennas may pass through corresponding openings of a guide structure. In addition, as shown in FIG. 8, the signals which have passed through the openings of the guide structure (or signals before passing through the openings) may be controlled by a data flow processor 840. For example, the data flow processor 840 may determine whether the number of signals to be transmitted exceeds a predetermined threshold value or not. The data flow processor 840 may restrict the number of signals to be transmitted to the reception antennas according to a result of the determining by the data flow processor 840. The number of the restricted signals and the type of the signals may vary according to an implementation method. For example, the data flow processor 840 may restrict all of the signals 815*a*, 815*b*, and 815*c* from being transmitted to the reception antennas. In another example, the data flow processor 840 may restrict only the signal 815*a* from being transmitted to the reception antenna 824*a*, and allow signals 825*b* and 825*c* to reach reception antennas 824*b* and 824*c*, respectively.

Figure 9:
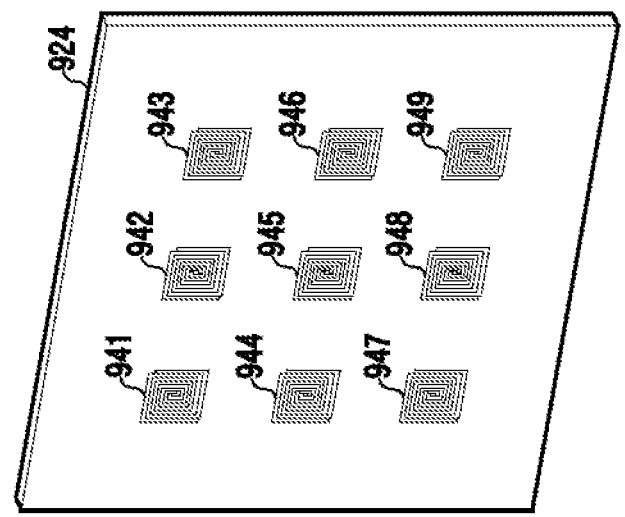
FIG. 9 illustrates a view showing antennas to explain an effect of a device to which an aperture array is applied in chip-to-chip wireless communication according to various embodiments of the present disclosure.
Figure 9:
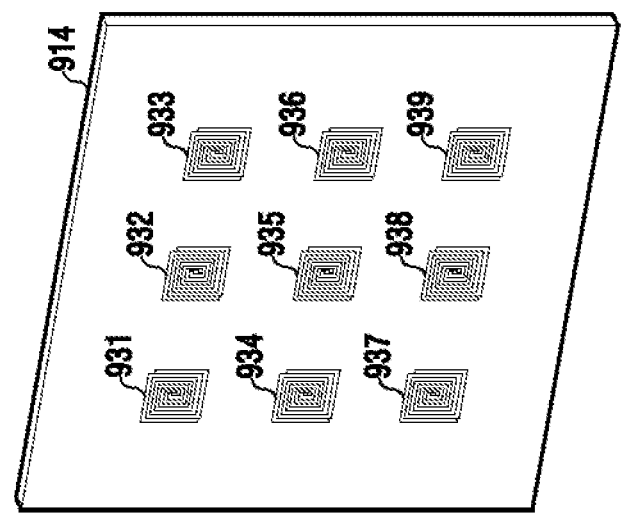

FIG. 9 illustrates a view showing antennas to explain an effect of a device to which an aperture array is applied in chip-to-chip wireless communication according to various embodiments of the present disclosure.

Referring to FIG. 9, a transmitter 914 includes transmission antennas 931 to 939. In addition, a receiver 924 includes reception antennas 941 to 949. The number of the transmission antennas and the number of the reception antennas are merely examples, and do not limit the scope of the present disclosure. A varying number of transmission antennas and a varying number of reception antennas may be applied. The transmission antennas 931 to 939 transmit signals generated from the transmission processor 112 to the reception antennas 941 to 949. The transmitter 914 should transmit signals generated from the plurality of antennas of the transmitter 914 to the plurality of corresponding antennas of the receiver 924 in consideration of directivity of signals. For example, the transmitter 914 may transmit a signal to the reception antenna 941 via the transmission antenna 931, transmit a signal to the reception antenna 942 via the transmission antenna 932, and transmit a signal to the reception antenna 949 via the transmission antenna 939.

FIGS. 10A, 10B, 10C, and 10D illustrate graphs showing an effect of a device to which an aperture array is applied in chip-to-chip wireless communication according to various embodiments of the present disclosure.

Referring to FIGS. 10A to 10D, the x-axis of the illustrated graphs indicates a frequency band. Herein, the unit of the frequency band is GHz. The y-axis of the illustrated graphs indicates a magnitude of a signal. Herein, the unit of the magnitude of the signal is dB. For example, in graph 1022, the magnitude of the signal is highest at about 210 GHz, and the magnitude of the signal is about −18 dB.

Signals illustrated in FIGS. 10A to 10D are signals which are transmitted at a frequency band of 200 GHz to 300 GHz. In other words, signals which have high magnitudes at the frequency band of 200 GHz to 300 GHz arrive at desired points.

Figure 10A:
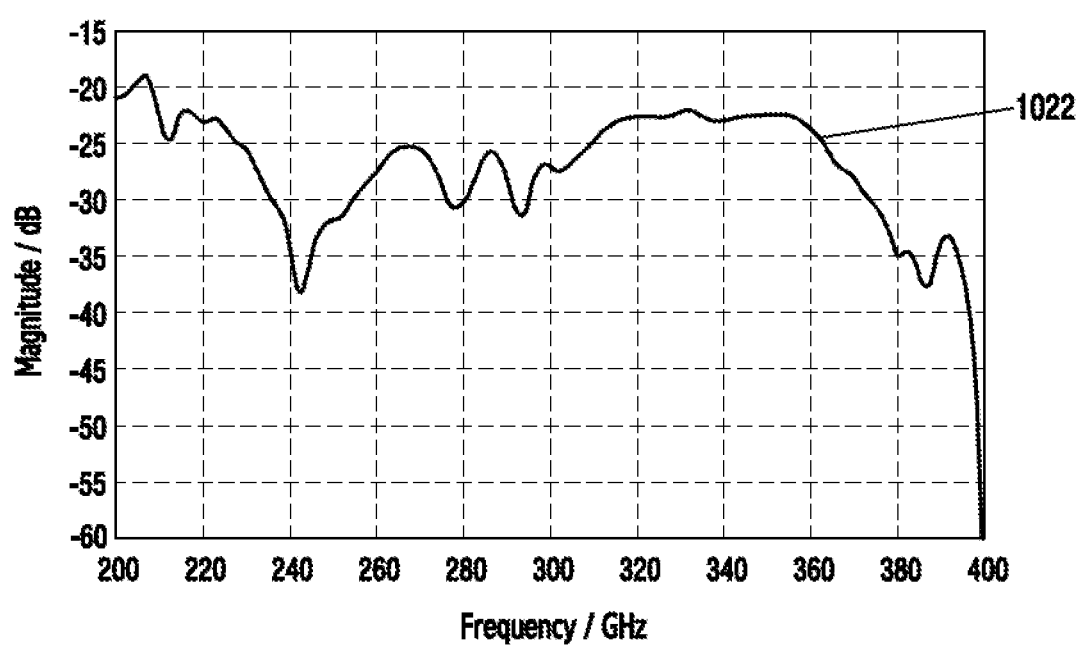
FIGS. 10A, 10B, 10C, and 10D illustrate graphs to illustrate an effect of a device to which an aperture array is applied in chip-to-chip wireless communication according to various embodiments of the present disclosure.
Figure 10B:
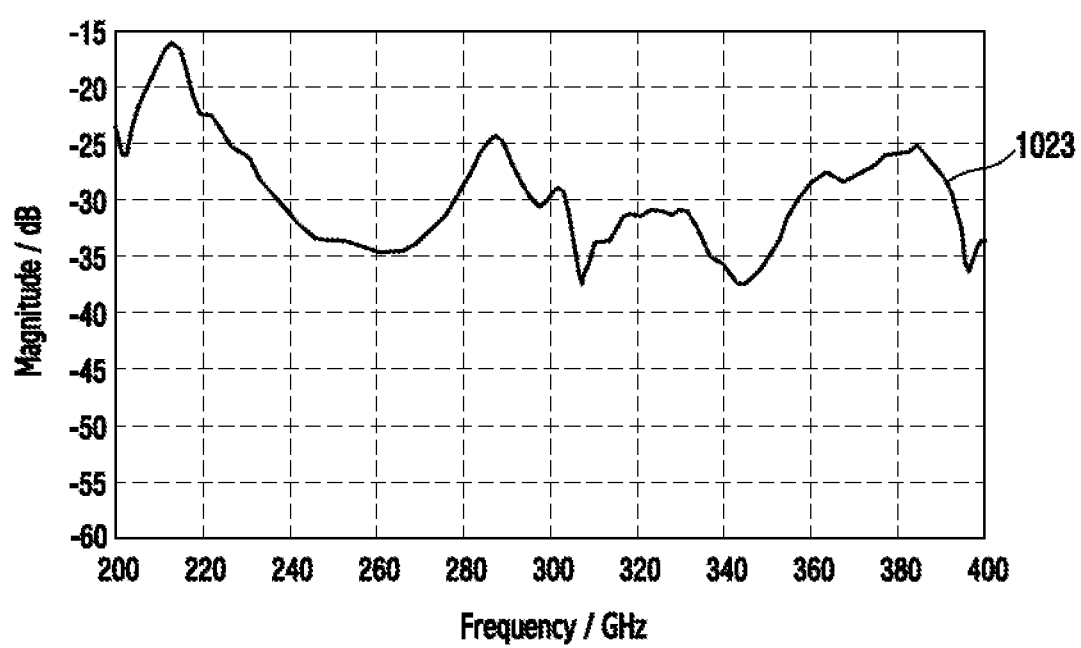
Figure 10C:
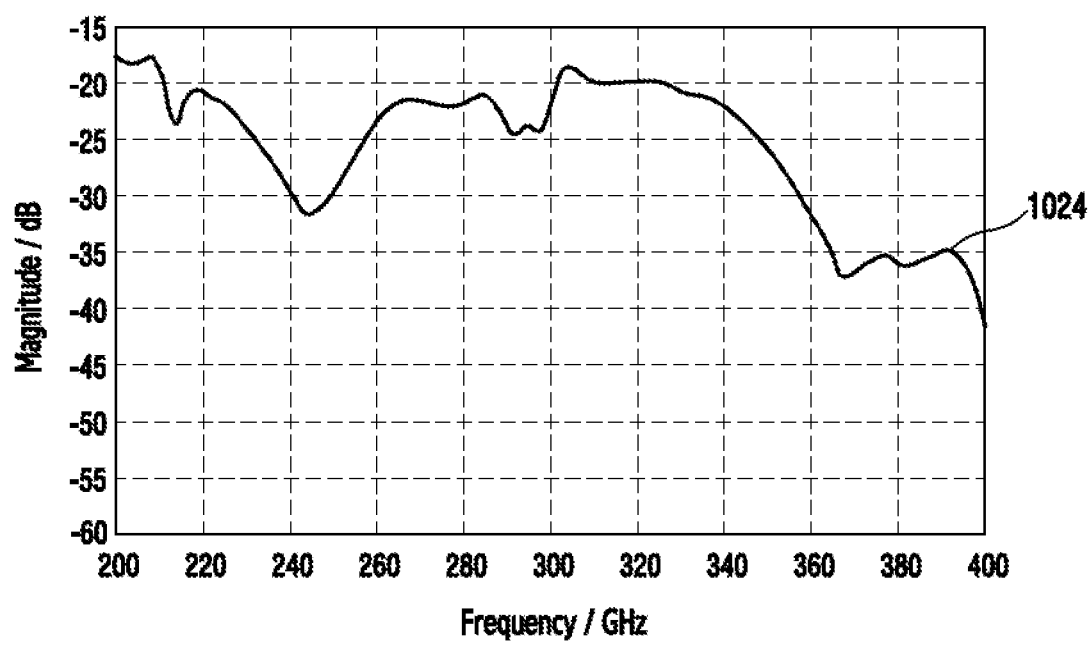
Figure 10D:
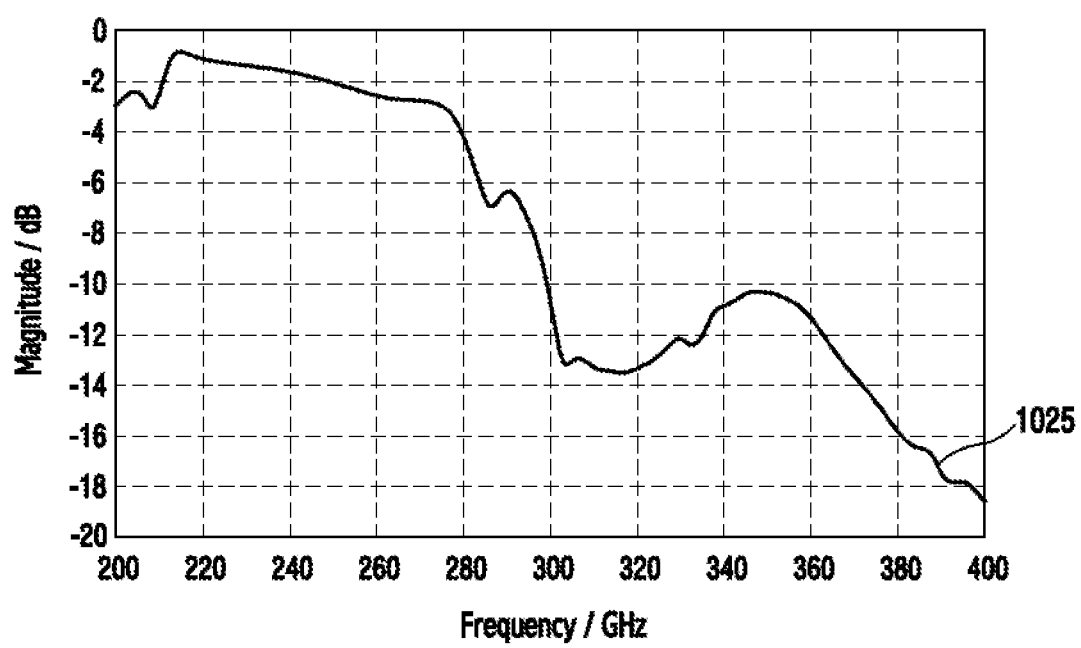

FIGS. 10A to 10D illustrate the magnitudes of the signals generated from the transmission antennas 935 of the transmitter 914 shown in FIG. 9. The magnitudes of the signals may be measured at the reception antennas 942, 943, 944, and 945 of the receiver 924 shown in FIG. 9. In other words, FIG. 10A illustrates the magnitude of the signal measured at the reception antenna 942, FIG. 10B illustrates the magnitude of the signal measured at the reception antenna 943, FIG. 10C illustrates the magnitude of the signal measured at the reception antenna 944, and FIG. 10D illustrates the magnitude of the signal measured at the reception antenna 945.

Referring to FIGS. 10A to 10C, all of the graphs 1022 to 1025 indicate that the magnitude of the signal is weak or irregular at the frequency band of 200 GHz to 300 GHz. For example, in FIG. 10A, the graph 1022 indicates that the magnitude of the signal at the frequency band of 200 GHz is about −20 dB. However, the graph 1025 shown in FIG. 10D indicates that the magnitude of the signal at the frequency band of 200 GHz to 300 GHz is high and is regular. For example, in FIG. 10D, the graph 1025 indicates that the magnitude of the signal at the frequency band of 200 GHz is about −2 dB. In other words, the signal generated from the transmission antenna 935 has the highest and regular magnitude at the reception antenna 945. That is, the graph 1025 indicates that the signal generated from the transmission antenna 935 arrives at the reception antenna 945 while maintaining directivity.

The methods according to the various embodiments described in the claims or descriptions of the present disclosure may be implemented by hardware, software, or a combination of hardware and software.

The software may be stored in a computer readable storage medium. The computer readable storage medium may store at least one program (software module) and at least one program including instructions for the electronic device to perform the method of the present disclosure when being executed by at least one processor in the electronic device.

The software may be stored in a volatile storage device or a non-volatile storage device such as a read only memory (ROM), a memory such as a random access memory (RAM), a memory chip device, or an integrated circuit, or an optical or magnetic readable medium such as a compact disc-ROM (CD-ROM), digital versatile discs (DVDs), a magnetic disk, or a magnetic tape.

The storage device and the storage medium are various embodiments of a machine-readable storing means which is appropriate to store a program or programs including the instructions for implementing the embodiments when being executed. The various embodiments provide a program including a code for implementing the device or method as claimed in any one of the claims of the specification, and a machine-readable storage medium for storing such a program. Furthermore, these programs may be electronically transmitted by a certain means such as a communication signal which is transmitted through wired or wireless connection, and the various embodiments appropriately include the equivalents.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for chip-to-chip wireless communication, the device comprising:
   a transmitter comprising a plurality of transmission antennas for transmitting a plurality of signals;
   a receiver comprising a plurality of reception antennas for receiving the plurality of signals;

a guide structure disposed between the transmitter and the receiver, and comprising a plurality of openings for guiding paths of the plurality of signals; and a data flow processor disposed between the transmitter and the receiver configured to control a number of the plurality of signals to be transmitted based on a data throughput of the receiver, wherein the plurality of transmission antennas are disposed on a first surface of the guide structure faced with the transmitter, and the plurality of reception antennas are disposed within a predetermined distance from a second surface of the guide structure faced with the receiver, wherein each of the plurality of transmission antennas and each of the plurality of reception antennas face each other across each of the plurality of openings, wherein the predetermined distance is shorter than an inner diameter of each of the openings, and wherein the data flow processor is further configured to:
determine a threshold value based on state information of the receiver, the state information comprising information on a current amount of jobs of the receiver, information on whether there is a load on the job, and information of a capability of the receiver to process operations simultaneously,
transmit only signals of the plurality of signals that does not exceed the threshold value, when the number of the plurality of signals transmitted to the receiver exceeds the threshold value, and
transmit the plurality of signals, when the number of the plurality signals transmitted to the receiver does not exceed the threshold value.

2. The device of claim 1, wherein a cross section of each of the plurality of openings has at least one of a rectangular shape, a spherical shape, a polygonal shape, or a spiral shape.

3. The device of claim 1, wherein an inner diameter of each of the plurality of openings is smaller than a width of each of the plurality of transmission antennas or the plurality of reception antennas.

4. The device of claim 1,
wherein the plurality of transmission antennas are disposed on a surface of the transmitter, and
wherein the plurality of reception antennas are disposed on a surface of the receiver.

5. An operating method for chip-to-chip wireless communication, the operating method comprising:
transmitting, by a transmitter comprising a plurality of transmission antennas, a plurality of signals;
guiding, by a guide structure comprising a plurality of openings, paths of the plurality of signals;
receiving, by a receiver comprising a plurality of reception antennas, the guided plurality of signals;
controlling, by a data flow processor disposed between the transmitter and the receiver, a number of the plurality of signals to be transmitted based on a data throughput of the receiver;
determining a threshold value based on state information of the receiver, the state information comprising information on a current amount of jobs of the receiver, information on whether there is a load on the job, and information of a capability of the receiver to process operations simultaneously;
transmitting only signals of the plurality of signals that does not exceed the threshold value, when the number of the plurality of signals transmitted to the receiver exceeds the threshold value; and
transmitting the plurality of signals, when the number of the plurality of signals transmitted to the receiver does not exceed the threshold value,
wherein each of the transmitter, the guide structure, and the receiver are stacked one on another in sequence,
wherein the guide structure disposed between the transmitter and the receiver, and comprising a plurality of openings for guiding paths of the plurality of signals,
wherein the plurality of transmission antennas are disposed on a first surface of the guide structure faced with the transmitter, and the plurality of reception antennas are disposed within a predetermined distance from a second surface of the guide structure faced with the receiver,
wherein each of the plurality of transmission antennas and each of the plurality of reception antennas face each other across each of the plurality of openings, and
wherein the predetermined distance is shorter than an inner diameter of each of the openings.

6. The operating method of claim 5, wherein a cross section of each of the plurality of openings has at least one of a rectangular shape, a spherical shape, a polygonal shape, or a spiral shape.

7. The operating method of claim 5, wherein an inner diameter of each of the plurality of openings is smaller than a width of each of the plurality of transmission antennas or each of the plurality of reception antennas.

8. The operating method of claim 5,
wherein the plurality of transmission antennas are disposed on a surface of the transmitter, and
wherein the plurality of reception antennas are disposed on a surface of the receiver.

9. A non-transitory computer readable medium embodying a computer program, the computer program comprising computer readable program code for:
transmitting, by a transmitter comprising a plurality of transmission antennas, a plurality of signals;
guiding, by a guide structure comprising a plurality of openings, paths of the plurality of signals;
receiving, by a receiver comprising a plurality of reception antennas, the guided plurality of signals;
controlling, by a data flow processor disposed between the transmitter and the receiver, a number of the plurality of signals to be transmitted based on a data throughput of the receiver;
determining a threshold value based on state information of the receiver, the state information comprising information on a current amount of jobs of the receiver, information on whether there is a load on the job, and information of a capability of the receiver to process operations simultaneously;
transmitting only signals of the plurality of signals that does not exceed the threshold value, when the number of the plurality of signals transmitted to the receiver exceeds the threshold value; and
transmitting the plurality of signals, when the number of the plurality of signals transmitted to the receiver does not exceed the threshold value,
wherein the guide structure disposed between the transmitter and the receiver, and comprising a plurality of openings for guiding paths of the plurality of signals,
wherein the plurality of transmission antennas are disposed on a first surface of the guide structure faced with the transmitter, and the plurality of reception antennas are disposed within a predetermined distance from a second surface of the guide structure faced with the receiver, wherein each of the plurality of transmission antennas and each of the plurality of reception antennas face each other across each of the plurality of openings, and wherein the predetermined distance is shorter than an inner diameter of each of the openings.

10. The non-transitory computer readable medium of claim 9, wherein a cross section of each of the openings has at least one of a rectangular shape, a spherical shape, a polygonal shape, or a spiral shape.

11. The non-transitory computer readable medium of claim 9, wherein an inner diameter of each of the openings is smaller than a width of each of the plurality of transmission antennas or each of the plurality of reception antennas.

12. The non-transitory computer readable medium of claim 9, wherein the plurality of transmission antennas are disposed on a surface of the transmitter, and wherein the plurality of reception antennas are disposed on a surface of the receiver.

* * * * *